(12) United States Patent
Schleif et al.

(10) Patent No.: US 10,030,811 B2
(45) Date of Patent: Jul. 24, 2018

(54) SYSTEMS AND METHODS FOR ATTACHING A DEVICE TO A ROTATING SHAFT

(71) Applicant: General Electric Company, Schenectady, NY (US)

(72) Inventors: Kurt Kramer Schleif, Greenville, SC (US); Peter Ping-Liang Sue, Greer, SC (US); Michael Davis Jacobs, The Woodlands, TX (US); Nathan Lee Brown, Simpsonville, SC (US); Mario Joseph Arceneaux, Simpsonville, SC (US); Paul Walter Dausacker, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 14/991,112

(22) Filed: Jan. 8, 2016

(65) Prior Publication Data
US 2016/0123528 A1  May 5, 2016

Related U.S. Application Data

(62) Division of application No. 13/935,961, filed on Jul. 5, 2013, now Pat. No. 9,261,384.

(51) Int. Cl.
| | | |
|---|---|---|
| *F16M 13/02* | (2006.01) |
| *G01D 11/16* | (2006.01) |
| *F01D 17/06* | (2006.01) |
| *G01D 11/30* | (2006.01) |
| *G01M 13/02* | (2006.01) |
| *G01D 21/00* | (2006.01) |

(52) U.S. Cl.
CPC ............. *F16M 13/02* (2013.01); *F01D 17/06* (2013.01); *G01D 11/16* (2013.01); *G01D 11/30* (2013.01); *G01M 13/02* (2013.01); *G01D 21/00* (2013.01); *Y10T 29/49947* (2015.01); *Y10T 403/7094* (2015.01); *Y10T 464/20* (2015.01)

(58) Field of Classification Search
CPC . Y10T 464/20; Y10T 403/7094; F16M 13/02; G01M 13/02; G01D 11/30; G01D 17/06; G01D 11/16; G01D 21/00
USPC .......... 464/23; 340/870.01; 73/1.09; 384/542
See application file for complete search history.

(56) References Cited

U.S. PATENT DOCUMENTS

| | | | | |
|---|---|---|---|---|
| 1,498,748 A | * | 6/1924 | Pierce, Jr. ................. | F16C 9/04 384/542 X |
| 1,685,046 A | * | 9/1928 | Eige ........................ | F16C 21/00 384/542 |
| 2,421,626 A | | 6/1947 | Kuehni | |

(Continued)

OTHER PUBLICATIONS

Vibro-Dynamics, Non-Linear Torsional Analysis, 2004 [online] [retrieved on Apr. 9, 2015] Retrieved from the Internet: <http://www.vibrodynamics.net/torsional_analysis.htm>.

*Primary Examiner* — Greg Binda
(74) *Attorney, Agent, or Firm* — Eversheds Sutherland (US) LLP

(57) ABSTRACT

A system for attaching a device to a rotating shaft is provided herein. The system may include a rotating shaft, a telemetry transmitter positioned about the rotating shaft, and a housing positioned about the telemetry transmitter. The telemetry transmitter may be trapped by the housing. The system also may include a connector configured to connect the housing to the rotating shaft.

6 Claims, 9 Drawing Sheets

(56) References Cited

U.S. PATENT DOCUMENTS 2,961,872 A 11/1960 Metzmeier et al.
4,083,423 A 4/1978 Williams et al.
4,893,946 A * 1/1990 Tesh .................... D01H 4/12

* cited by examiner

SYSTEMS AND METHODS FOR ATTACHING A DEVICE TO A ROTATING SHAFT

CROSS-REFERENCE TO RELATED APPLICATIONS

The present disclosure claims priority to and is a divisional application of U.S. patent application Ser. No. 13/935,961, filed Jul. 5, 2013, now U.S. Pat. No., 9,261,384, which is herein incorporated by reference in its entirety.

FIELD OF THE DISCLOSURE

Embodiments of the present disclosure relate generally to rotating shafts and more particularly relate to systems and methods for attaching a device to a rotating shaft.

BACKGROUND OF THE DISCLOSURE

For testing, diagnostic, and/or health monitoring purposes, it may be desirable to acquire a measurement (such as strain, temperature, and/or pressure) on a rotating shaft. In many situations, a full-scale slip ring or telemetry system may not be feasible, both physically and economically. In such an instance, a strap-on telemetry system may provide the best solution. In a traditional strap-on telemetry system, the telemetry transmitter is placed on the outer diameter of the rotating shaft, and a strap is used to secure the telemetry transmitter. The strap is typically tensioned by a yoke assembly positioned on the opposite side of the rotating shaft. The strap is tensioned such that the downward force applied by the strap to the outer surface of the telemetry transmitter is greater than the forces generated by the rotating mass of the telemetry transmitter (due to centrifugal loading). In this manner, the greater the centrifugal loading, the more downward force is required in the strap. However, the greater the downward force in the strap, the more likely it is to damage the telemetry transmitter.

BRIEF DESCRIPTION OF THE DISCLOSURE

Some or all of the above needs and/or problems may be addressed by certain embodiments of the present disclosure. According to an embodiment, there is disclosed a system for attaching a device to a rotating shaft. The system may include a rotating shaft, a telemetry transmitter positioned about the rotating shaft, and a housing positioned about the telemetry transmitter. The telemetry transmitter may be trapped by the housing. The system also may include a connector configured to connect the housing to the rotating shaft.

According to another embodiment, there is disclosed a method for attaching a device to a rotating shaft. The method may include trapping a telemetry transmitter within a cavity formed between a base member and a cap member of a housing and connecting a dovetail associated with the base member of the housing to a dovetail slot disposed about a rotating shaft.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION OF THE DISCLOSURE

Figure 1:
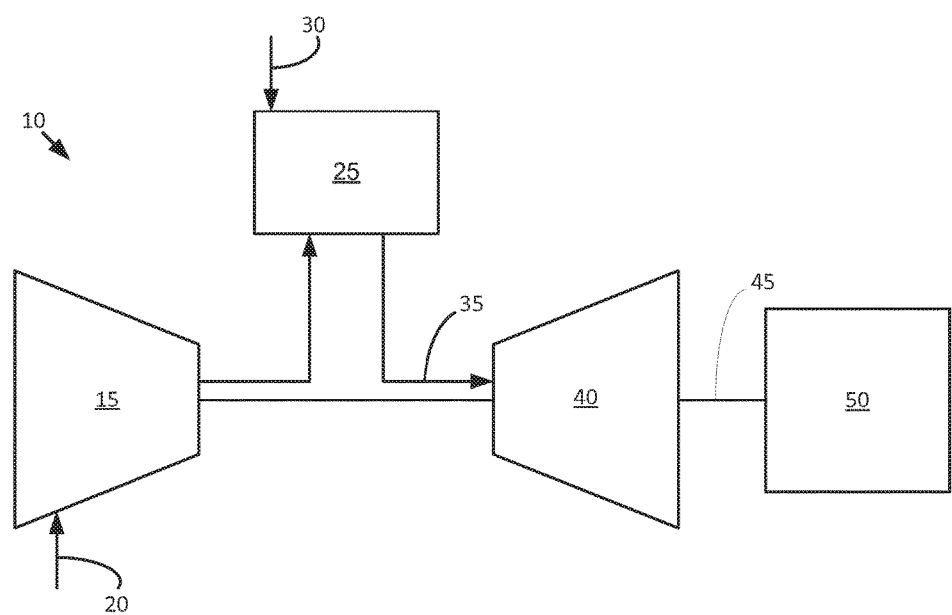
FIG. 1 is a schematic view of a gas turbine engine assembly that may be used herein, according to an embodiment.

Illustrative embodiments will now be described more fully hereinafter with reference to the accompanying drawings, in which some, but not all embodiments are shown. The present disclosure may be embodied in many different forms and should not be construed as limited to the embodiments set forth herein. Like numbers refer to like elements throughout.

Illustrative embodiments are directed to, among other things, systems and methods for attaching a device (such as a telemetry transmitter) to a rotating shaft (such as a rotor of a gas turbine engine assembly). The device may be any number of sensors and/or monitoring equipment, including, but not limited to, a strain sensor, a temperature, a pressure sensor, a frequency sensor, and/or a combination thereof. Other types of sensors or monitoring equipment may also be used herein. The device may be attached at any location along the rotor. For example, the device may be attached in the compressor, the turbine, and/or elsewhere. In some instances, the device may include wireless capabilities. In other instances, the device may be attached to diagnostic and/or other monitoring equipment by way of one or more wires or the like. The rotating shaft may be associated with any spinning device, including, but not limited to, gas turbine engines, steam turbines, wind turbines, load couplings, drive shafts, etc. Any spinning shaft and/or device may be used herein.

In certain embodiments, a system for attaching a device to a rotating shaft may include one or more intermediate members positioned about the device. The system also may include a restraining strap configured to apply a restraining force to at least one of the one or more intermediate members to secure the one or more intermediate members to the rotating shaft. In this manner, the one or more intermediate members may be configured to at least partially avert and/or disperse the restraining force of the restraining strap away from the device. The one or more intermediate members may be integral or separate from the device. That is, the one or more intermediate members and the device may be a single component or separate components.

In some instances, the one or more intermediate members may include a bridge-like structure. In this manner, the device may be trapped between the bridge-like structure and the rotating shaft. In other instances, the bridge-like structure may include one or more slots configured to receive the restraining strap therein. In this manner, the device may be trapped between the bridge-like structure and the restraining strap.

In certain embodiments, the one or more intermediate members may include a base having one or more slots configured to receive the restraining strap therein. The one or more intermediate members also may include a cap member configured to be attached to the base member. In some instances, a cavity may be formed between the base member and the cap member. The cavity may be configured to receive the device therein.

In certain embodiments, the one or more intermediate members may include a cradle-like structure. In this manner, the device may be trapped between the cradle-like structure and the restraining strap. In some instances, a contoured shim may be positioned between the cradle-like structure and the restraining strap. In yet other embodiments, the one or more intermediate members may form a shell about the device. Further, in some instances, a connector and/or wire support member may be disposed between the rotating shaft and the device.

According to another embodiment, a system for attaching a device to a rotating shaft may include a housing positioned about the device. In some instances, the housing may be formed by the one or more intermediate members. In this manner, the device may be trapped by the housing, positioned within the housing, and/or secured by the housing. Further, the system may include a connector configured to connect the housing to the rotating shaft. In some instances, the connector may include one or more bolts. In other instances, the connector may include a ridged band disposed about the rotating shaft. The housing may be integral or separate from the device. That is, the housing and the device may be a single component or separate components.

In certain embodiments, the housing may include a base member, a cap member configured to be attached to the base member, and a cavity formed between the base member and the cap member, wherein the cavity is configured to receive the device therein. In other embodiments, the connector may include a dovetail associated with the base member. Moreover, the connector may include a dovetail slot disposed about the rotating shaft. In this manner, the dovetail may be secured within the dovetail slot.

The one or more intermediate members and/or the housing may comprise materials (such as fiberglass) that are very strong and lightweight, yet do not interfere with the signal transmission of the transmitter. That is, transmission signals can pass through the materials of the one or more intermediate members and/or the housing. For example, the one or more intermediate members and/or the housing may be designed not to interfere with the communication between the transmitter and a stationary antenna. The one or more intermediate members and/or the housing may be any suitable material.

Referring now to the drawings, FIG. 1 shows a schematic view of gas turbine engine 10 as may be used herein. The gas turbine engine 10 may include a compressor 15. The compressor 15 compresses an incoming flow of air 20. The compressor delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. In this example, the combustor 25 may be in the form of a number of can combustors as will be described in more detail below. The flow of combustion gases 35 is in turn delivered to a downstream turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be anyone of a number of different gas turbine engines such as those offered by General Electric Company of Schenectady, N.Y. and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
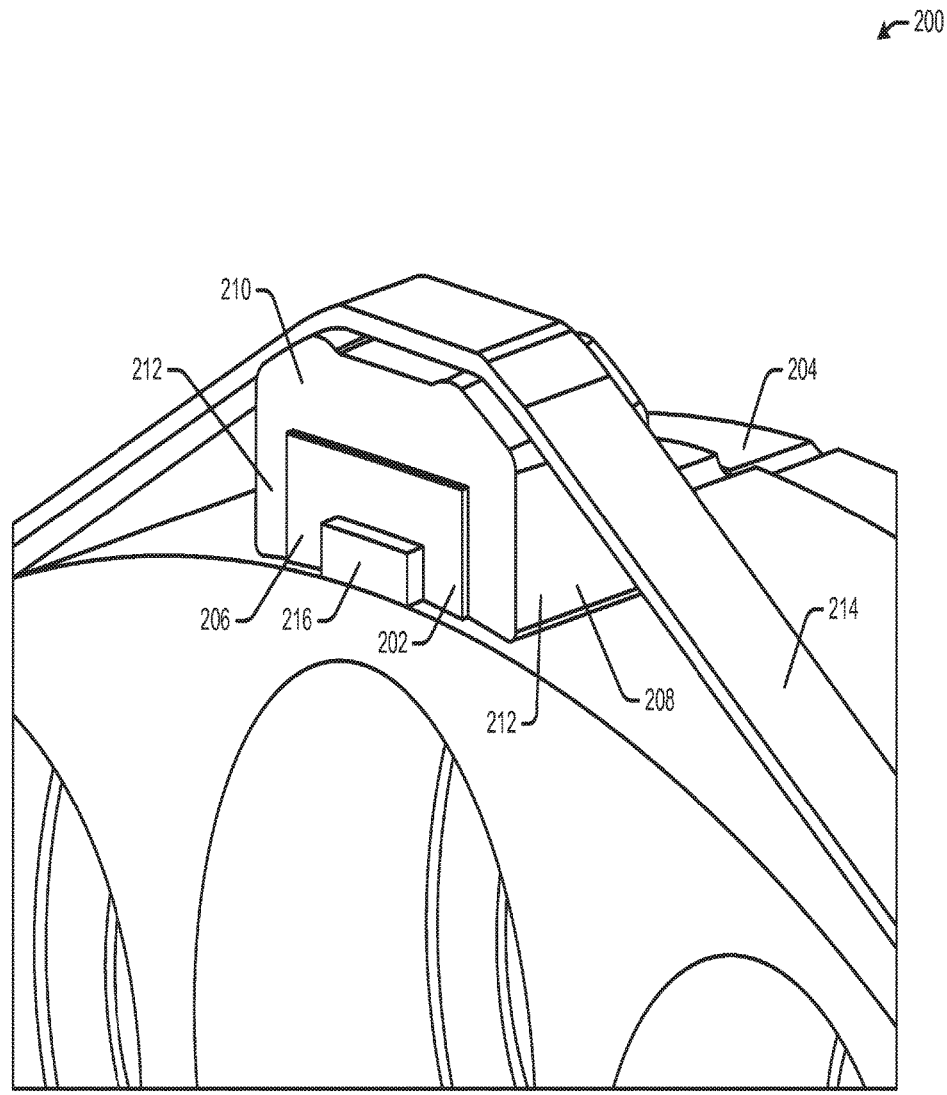
FIG. 2 is a schematic view of a system for attaching a device to a rotating shaft, according to an embodiment.

FIG. 2 depicts one example embodiment of a system 200 for attaching a device 202 to a rotating shaft 204. In some instances, the device 202 may include a telemetry transmitter 206. In other instances, the rotating shaft 204 may be similar to the shaft 45 of FIG. 1. One or more intermediate components 208 may be configured to trap the telemetry transmitter 206 on the outer diameter of the rotating shaft 204. In some instances, the one or more intermediate components 208 may be fabricated from fiberglass or the like, although any material may be used. As depicted in FIG. 2, the one or more intermediate members may form a bridge-like structure 210. The bridge-like structure 210 may be configured to span over the telemetry transmitter 206. The bridge-like structure 210 may include one or more columns 212. The columns 212 of the bridge-like structure 210 may be configured to carry a radially inward force exerted by a strap 214, thus preventing damage to the telemetry transmitter 206. The telemetry transmitter 206 loads against the underside of the bridge-like structure 210 during rotation of the rotating shaft 204, but the load applied by the strap 214 to the bridge-like structure 210 never passes through the telemetry transmitter 206. Rather, the load applied by the strap 214 passes through the columns 212 of the bridge-like structure 210. In certain embodiments, the strap 214 may be a Kevlar strap or the like. In some instances, a connector and/or wire support member 216 may be disposed between the rotating shaft 204 and the telemetry transmitter 206.

Figure 3:
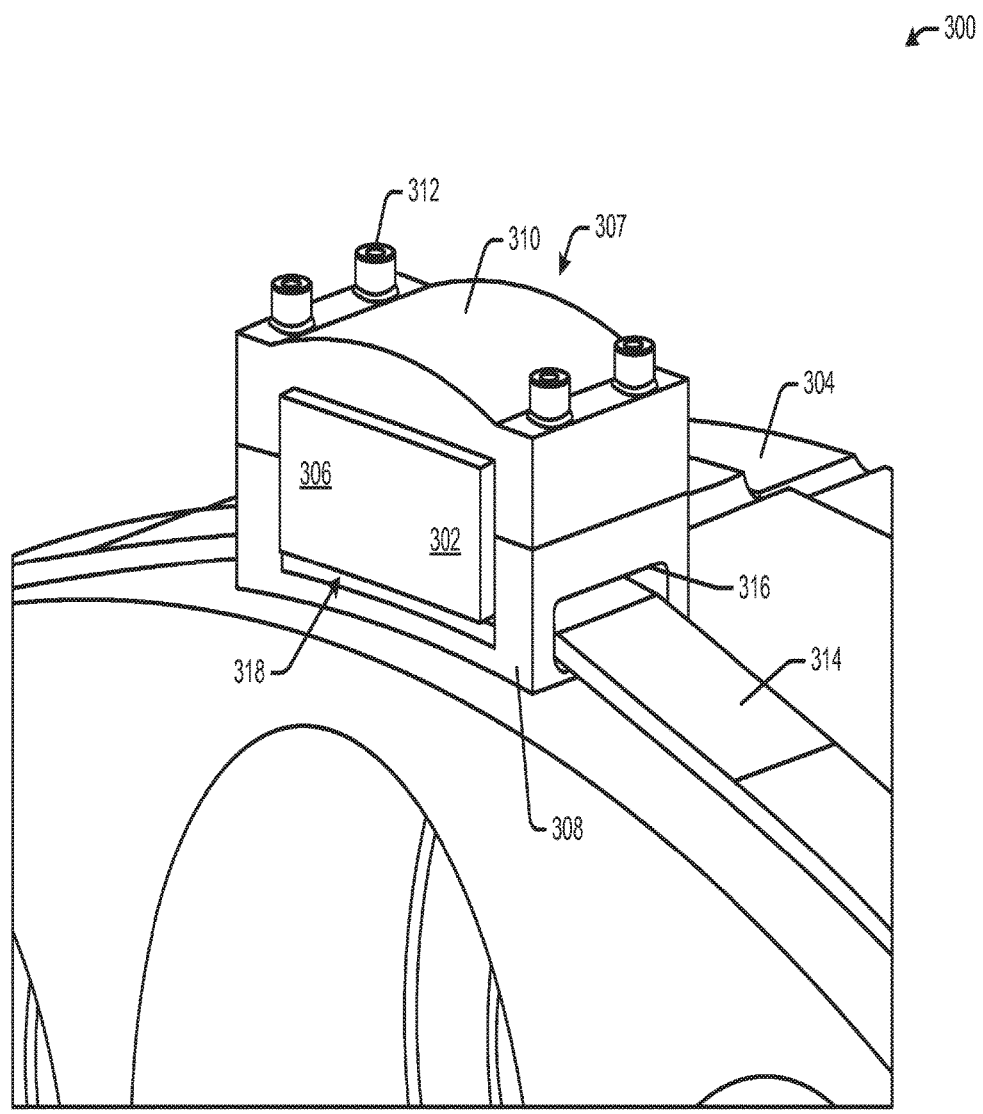
FIG. 3 is a schematic view of a system for attaching a device to a rotating shaft, according to an embodiment.

FIG. 3 depicts one example embodiment of a system 300 for attaching a device 302 to a rotating shaft 304. In some instances, the device 302 may include a telemetry transmitter 306. In other instances, the rotating shaft 304 may be similar to the shaft 45 of FIG. 1. The device 302 may be positioned within a housing 307. The housing 307 may include a base member 308 and a cap member 310. One or more bolts 312 or the like may be used to secure the base member 308 to the cap member 310. A strap 314 may be used to secure the base member 308 to the outer diameter of the rotating shaft 304. For example, the base member 308 may include one or more slots 316 configured to receive the strap 314 therein. The housing 307 may be formed of fiberglass, metal, or a combination thereof, although other material may be used. In this manner, the telemetry transmitter 306 may be trapped within a cavity 318 formed between the base member 308 and the cap member 310. The downward force applied by the strap 314 may be carried only by the base member 308.

Figure 4:
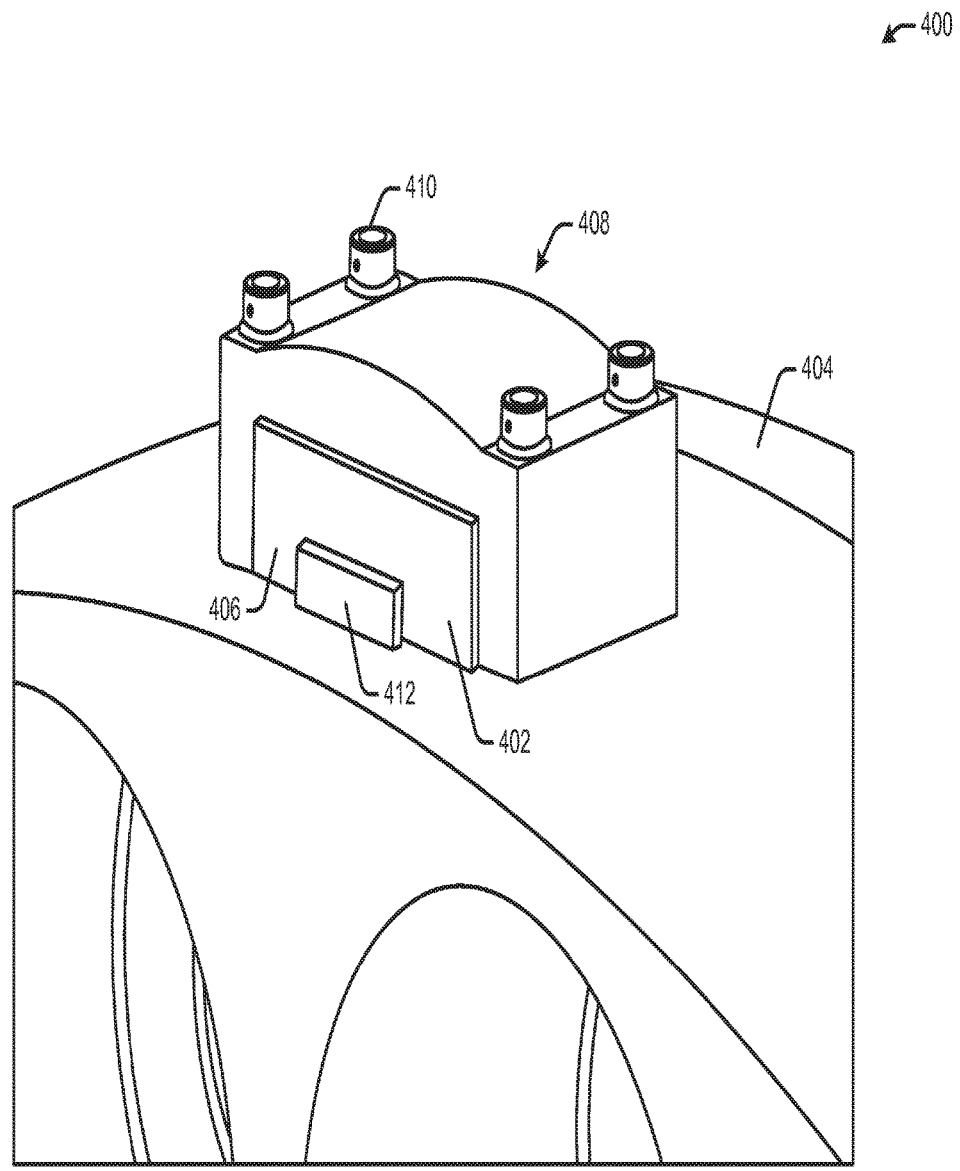
FIG. 4 is a schematic view of a system for attaching a device to a rotating shaft, according to an embodiment.

FIG. 4 depicts one example embodiment of a system 400 for attaching a device 402 to a rotating shaft 404. In some instances, the device 402 may include a telemetry transmitter 406. In other instances, the rotating shaft 404 may be similar to the shaft 45 of FIG. 1. In the system 400, the strap may be omitted. A housing 408 is used to trap the telemetry transmitter 406 between the housing 408 and the outer diameter of the rotating shaft 404. For example, the housing 408 may be secured to the outer diameter of the rotating shaft 404 by way of one or more bolts 410 or the like. In some instances, a connector and/or wire support member 412 may be disposed between the rotating shaft 404 and the telemetry transmitter 406.

Figure 5:
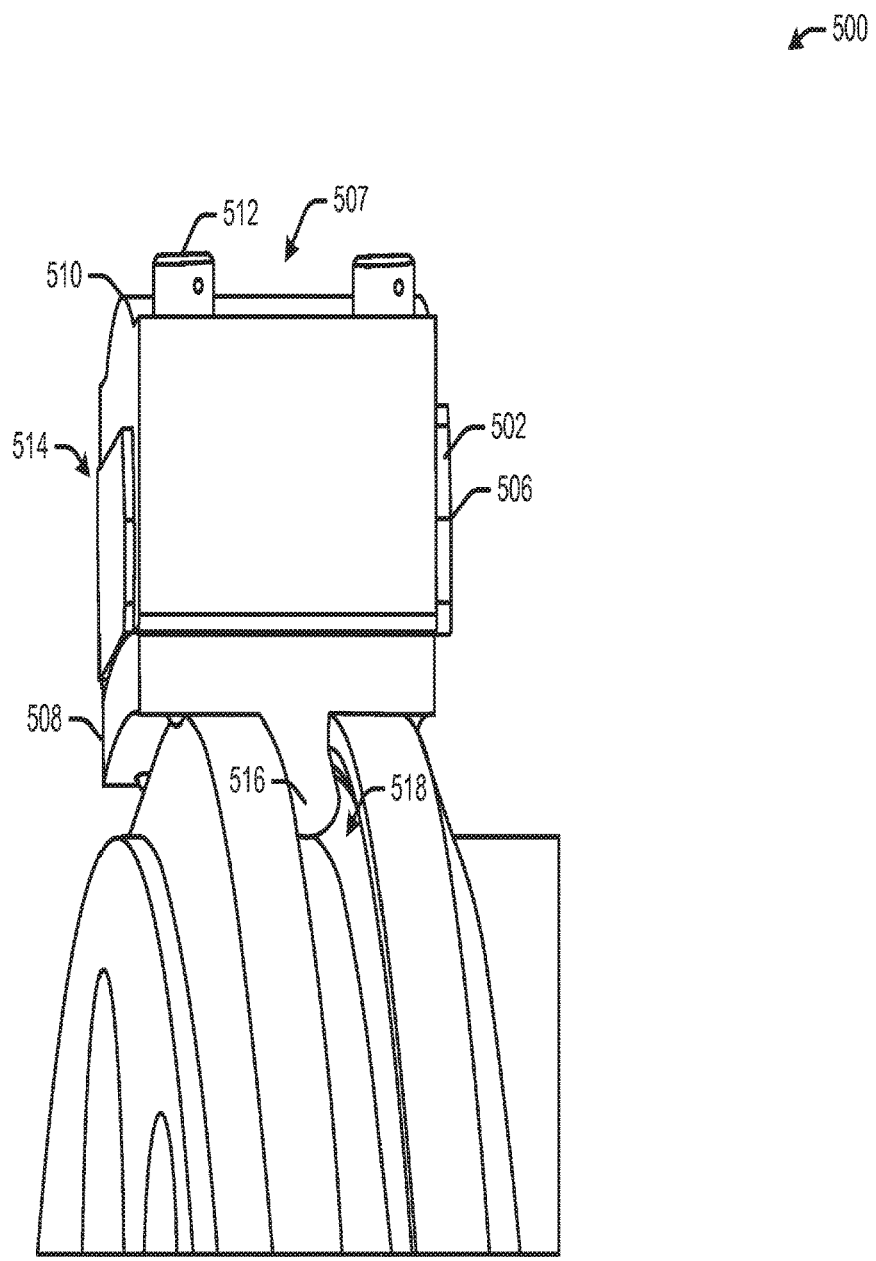
FIG. 5 is a schematic view of a system for attaching a device to a rotating shaft, according to an embodiment.

FIG. 5 depicts one example embodiment of a system 500 for attaching a device 502 to a rotating shaft 504. In some instances, the device 502 may include a telemetry transmitter 506. In other instances, the rotating shaft 504 may be similar to the shaft 45 of FIG. 1. The device 502 may be positioned within a housing 507. The housing 507 may include a base member 508 and a cap member 510. One or more bolts 512 or the like may be used to secure the base member 508 to the cap member 510. In this manner, the telemetry transmitter 506 may be trapped within a cavity 514 formed between the base member 508 and the cap member 510. The base member 508 may include a dovetail 516 associated with the base member 508. Moreover, the rotating shaft 504 may include a dovetail slot 518 disposed about the rotating shaft 504. In this manner, the dovetail 516 may be secured within the dovetail slot 518. When under rotation, the dovetail assembly restrains the housing 507, securing it to the rotating shaft 504.

Figure 6:
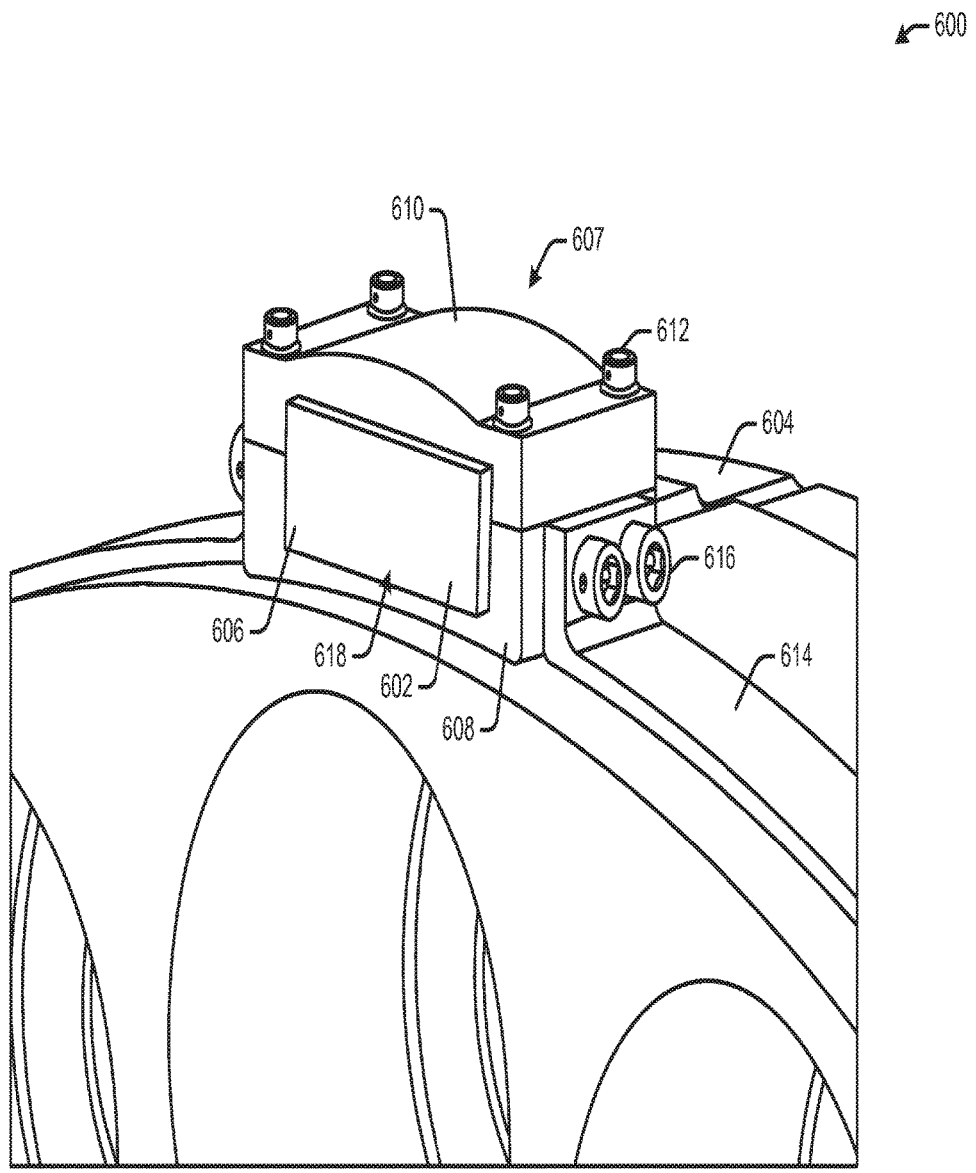
FIG. 6 is a schematic view of a system for attaching a device to a rotating shaft, according to an embodiment.

FIG. 6 depicts one example embodiment of a system 600 for attaching a device 602 to a rotating shaft 604. In some instances, the device 602 may include a telemetry transmitter 606. In other instances, the rotating shaft 604 may be similar to the shaft 45 of FIG. 1. The device 602 may be positioned within a housing 607. The housing 607 may include a base member 608 and a cap member 610. One or more bolts 612 or the like may be used to secure the base member 608 to the cap member 610. A semi-rigid band 614 or the like may be used to secure the base member 608 to the outer diameter of the rotating shaft 604. For example, one or more bolts 616 or the like may be used secure the ends of the semi-rigid band 614 to the base member 608. In this manner, the telemetry transmitter 606 may be trapped within a cavity 618 formed between the base member 608 and the cap member 610.

Figure 7:
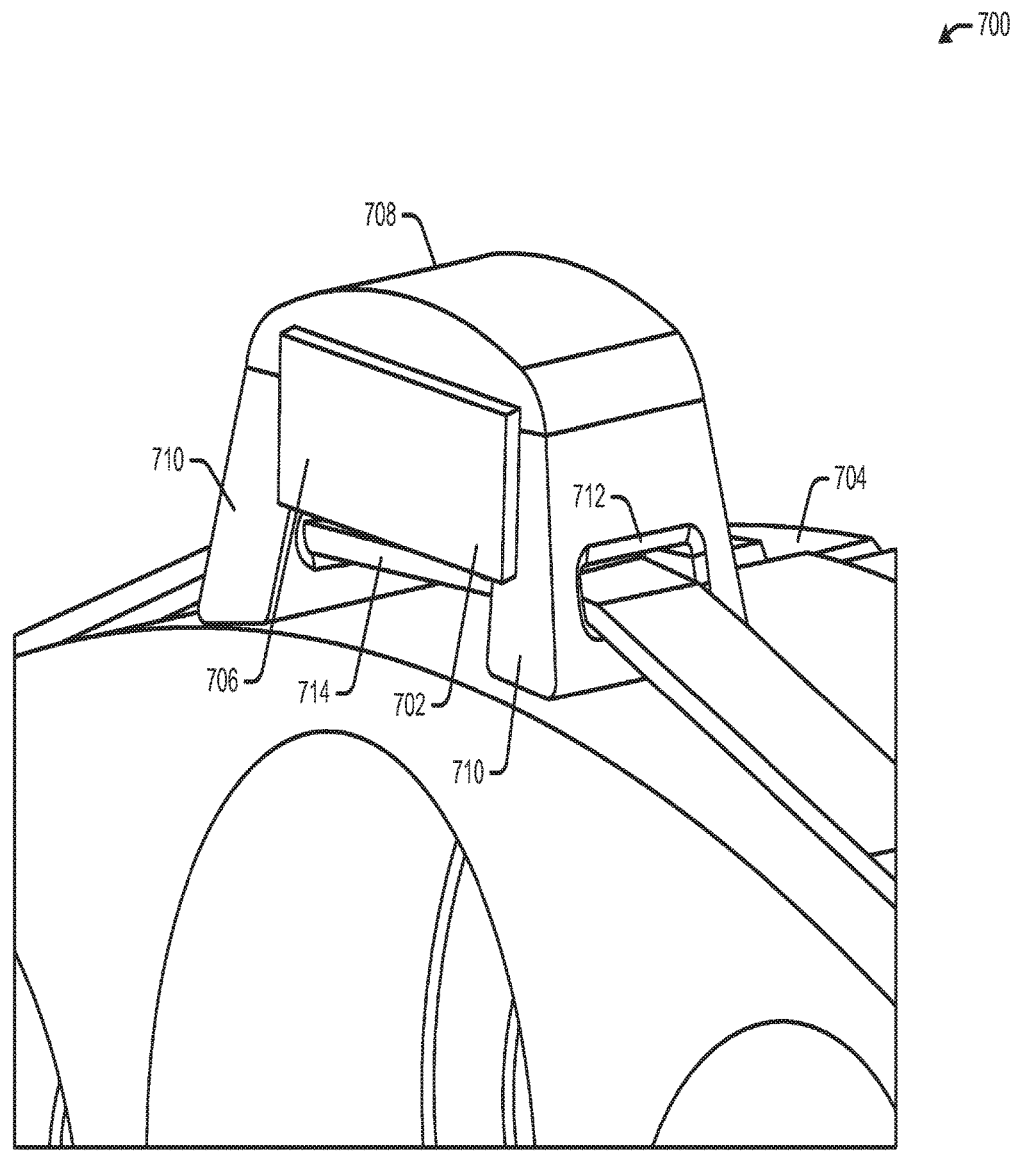
FIG. 7 is a schematic view of a system for attaching a device to a rotating shaft, according to an embodiment.

FIG. 7 depicts one example embodiment of a system 700 for attaching a device 702 to a rotating shaft 704. In some instances, the device 702 may include a telemetry transmitter 706. In other instances, the rotating shaft 704 may be similar to the shaft 45 of FIG. 1. A bridge-like structure 708 may be configured to trap the telemetry transmitter 706. For example, the bridge-like structure 708 may be configured to span over the telemetry transmitter 706. The bridge-like structure 708 may include one or more columns 710. The one or more columns 710 may include one or more slots 712 configured to receive a strap 714 therein. In this manner, the telemetry transmitter 706 may be trapped between the bridge-like structure 708 and the strap 714. The columns 710 of the bridge-like structure 708 may be configured to carry the downward force generated by the strap 714.

Figure 8:
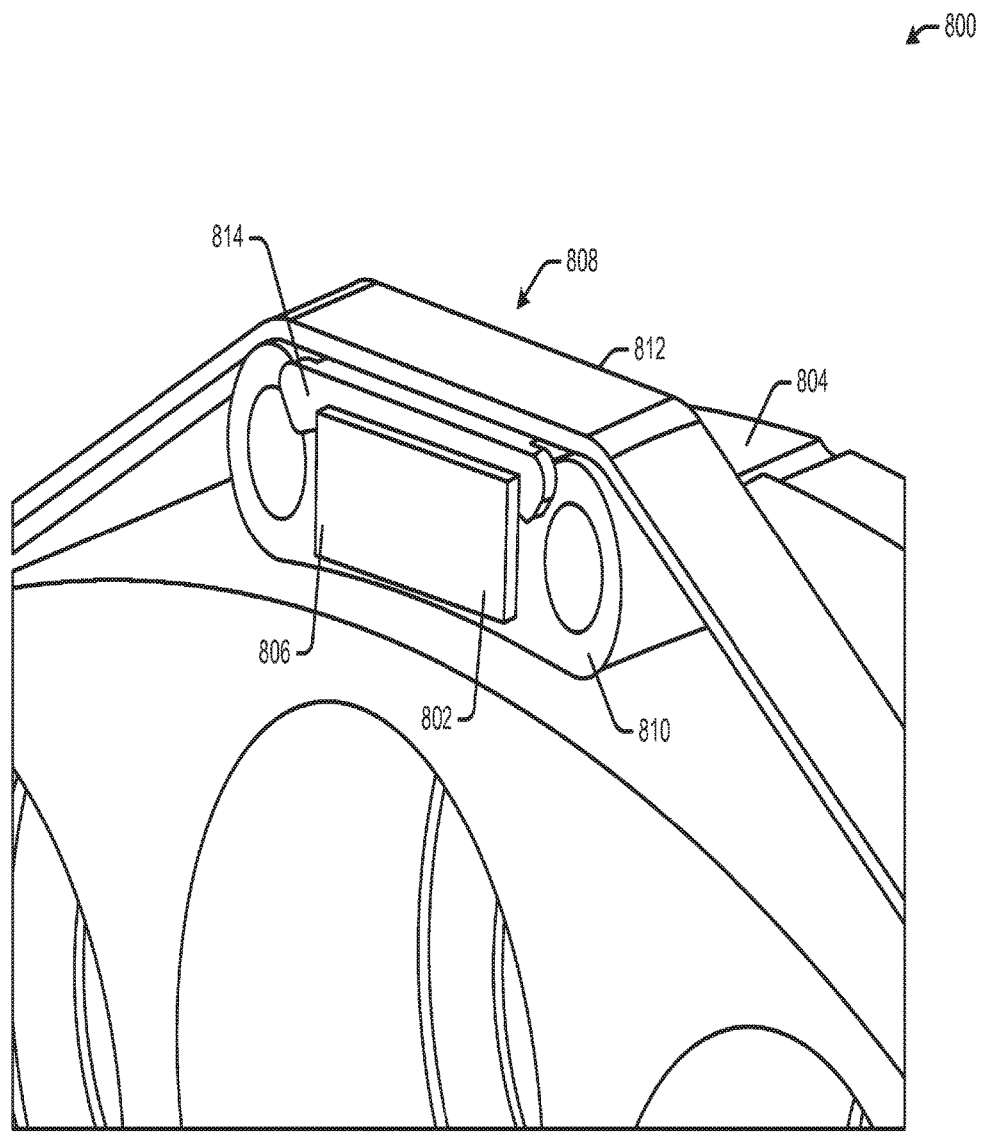
FIG. 8 is a schematic view of a system for attaching a device to a rotating shaft, according to an embodiment.

FIG. 8 depicts one example embodiment of a system 800 for attaching a device 802 to a rotating shaft 804. In some instances, the device 802 may include a telemetry transmitter 806. In other instances, the rotating shaft 804 may be similar to the shaft 45 of FIG. 1. One or more intermediate components 808 may be configured to trap and/or house the telemetry transmitter 806. For example, the one or more intermediate components 808 may form a cradle-like structure 810. In this manner, the telemetry transmitter 806 may be trapped between the cradle-like structure 810 and a strap 812. In some instances, a contoured shim 814 may be positioned between the cradle-like structure 810 and the strap 812. In this manner, the cradle-like structure 810 carries the downward force generated by the strap 812. As a result, the strap 812 traps the telemetry transmitter 806 preventing radial motion.

Figure 9:
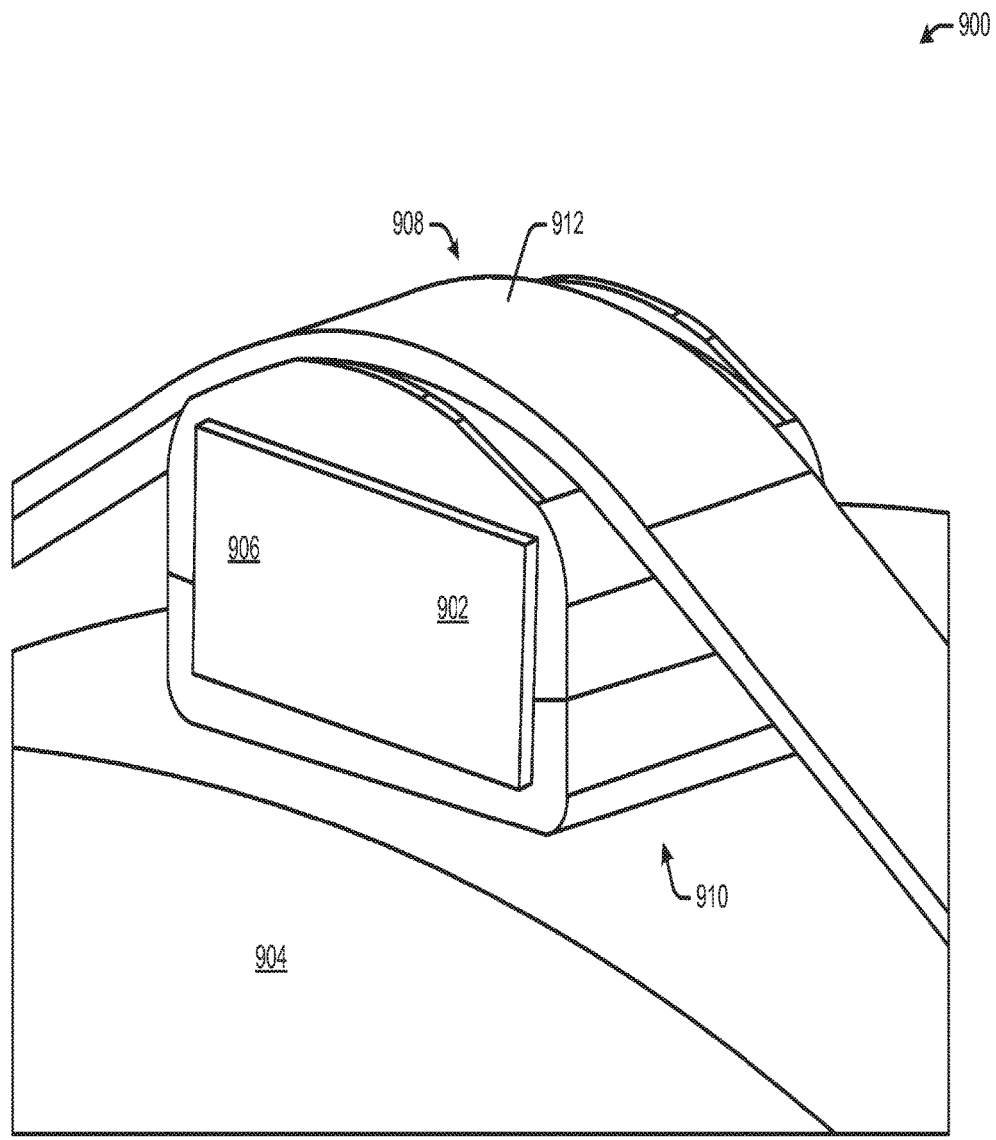
FIG. 9 is a schematic view of a system for attaching a device to a rotating shaft, according to an embodiment.

FIG. 9 depicts one example embodiment of a system 900 for attaching a device 902 to a rotating shaft 204. In some instances, the device 902 may include a telemetry transmitter 906. In other instances, the rotating shaft 904 may be similar to the shaft 45 of FIG. 1. One or more intermediate components 908 may be configured to trap the telemetry transmitter 906. In some instances, the one or more intermediate components 908 may form a shell or housing 910 about the telemetry transmitter 906. The shell or housing 910 may be configured to carry the downward force generated by a strap 912.

The embodiments described herein provide systems and methods wherein the only significant loads exerted on the telemetry transmitter are centrifugal loads generated by the telemetry transmitter's own weight. Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system for attaching a device to a shaft, the system comprising:
   a rotating shaft;
   a telemetry transmitter positioned about the rotating shaft;
   a housing comprising a base member and a cap member positioned around the telemetry transmitter, wherein the telemetry transmitter is trapped within the housing between the base member and the cap member; and
   a connector configured to connect the housing to the rotating shaft, wherein the connector comprises
   a dovetail attached to the base member, and
   a dovetail slot disposed within the rotating shaft.

2. The system of claim 1, wherein the rotating shaft comprises a rotor of a gas turbine engine assembly, a steam turbine, a wind turbine, load couplings, or drive shafts.

3. The system of claim 1, further comprising:
   a cavity formed between the base member and the cap member, wherein the cavity is configured to receive and trap the telemetry transmitter therein.

4. The system of claim 1, wherein the dovetail extends from the base member.

5. The system of claim 1, wherein the dovetail is secured within the dovetail slot to secure the housing to the rotating shaft.

6. The system of claim 1, further comprising one or more bolts to secure the base member to the cap member.

* * * * *